United States Patent [19]

Morelock

[11] 4,150,998

[45] Apr. 24, 1979

[54] ROTARY SEALANT ABRADABLE MATERIAL AND METHOD FOR MAKING

[75] Inventor: Charles R. Morelock, Ballston Spa, N.Y.

[73] Assignee: General Electric Company, Schenectady, N.Y.

[21] Appl. No.: 748,931

[22] Filed: Dec. 9, 1976

[51] Int. Cl.$^2$ .............................................. C04B 35/52
[52] U.S. Cl. ...................................... 106/44; 423/345; 264/65; 264/66
[58] Field of Search ................... 51/296, 298; 264/65, 264/86, 56, 60, 66; 106/36, 44; 75/DIG. 1, 201, 229, 243; 277/53, 96; 423/345

[56] References Cited

U.S. PATENT DOCUMENTS

| | | | |
|---|---|---|---|
| 2,938,807 | 5/1960 | Anderson | 106/44 |
| 3,035,325 | 5/1962 | Nicholson et al. | 106/44 |
| 3,269,802 | 8/1966 | Wainer et al. | 106/44 |
| 3,383,207 | 5/1968 | Butts | 75/222 |
| 3,494,774 | 2/1970 | Bray | 106/36 |
| 3,547,455 | 12/1970 | Daunt | 277/53 |
| 3,712,428 | 1/1973 | Marin | 264/60 |
| 3,736,159 | 5/1973 | Gibson et al. | 264/86 |
| 3,850,590 | 11/1974 | Chalkley et al. | 51/298 |
| 3,874,856 | 4/1975 | Leeds | 51/296 |
| 3,888,661 | 6/1975 | Levitt et al. | 75/201 |
| 3,904,405 | 9/1975 | Russell | 75/201 |
| 3,918,925 | 11/1975 | McComas | 75/229 |
| 3,947,550 | 3/1976 | Fitchmun | 106/44 |
| 3,951,587 | 4/1976 | Alliegro et al. | 106/44 |
| 4,019,913 | 4/1977 | Weaver et al. | 106/44 |

Primary Examiner—Donald J. Arnold
Attorney, Agent, or Firm—William A. Teoli; Joseph T. Cohen; Charles T. Watts

[57] ABSTRACT

Abradable materials useful as rotary sealant are provided and a method for making such materials. A mixture of silicon powder having a particular particle size range, carbon fiber and a binder is initially pressed to shape and thereafter heated in a mold to an elevated temperature to produce a shaped abradable mass.

4 Claims, No Drawings

ROTARY SEALANT ABRADABLE MATERIAL AND METHOD FOR MAKING

The present invention relates to a method for making abradable material useful as rotary sealant on turbine buckets and aircraft engine. More particularly, the present invention relates to a method for making rotary sealant by heating a shaped blend of carbon fiber and silicon powder in a non-oxidizing atmosphere under reduced pressure to a temperature sufficient to convert the silicon powder to the molten state.

Prior the present invention, rotary seals used in various parts of power producing apparatus, such as gas turbines, were made by various procedures, such as shown by Butts U.S. Pat. No. 3,383,207 and Daunt U.S. Pat. No. 3,547,455. An abradable material was used to provide a seal between a rotating member and a stationary member to inhibit fluid flow between such members. Some of the abradable materials were based on the use of an epoxy resin and certain hollow organic particles having a bulk density of 3–5 pounds per cubic foot and an outside diameter of up to 0.02 inch. Other types of abradable materials are shown by the aforementioned patent of Butts, based on the use of a plurality of hollow substantially spherical powder particles and more particularly the use of substantially spherical coated aluminum powder.

In copending application of Hillig et al, a method of making molten silicon infiltration reaction products and products made thereby, Ser. No. 660,261, filed Feb. 23, 1976 now U.S. Pat. No. 4,120,731 and assigned to the same assignee as the present invention, certain machinable castings are described and a method for making such materials. The castings can be employed as contiguous layers on shaped ceramic substrates, such as silicon carbide-silicon composites which may be in the form of a gas turbine shroud section. As described by Hillig et al, the aforementioned contiguous layers or composites having such contiguous layer integrally bonded to a ceramic base can be made by the infiltration of molten silicon into a mold containing a uniform mixture of particulated carbon and a particulated inorganic material, such as boron nitride, which can be in contact with either a shaped mass of silicon carbide or a composite of silicon and silicon carbide or a carbon fiber preform. Although the afornmentioned procedure of Hillig et al provides for valuable machinable castings or composites consisting of a ceramic base and an abradable surface layer, it requires the incorporation of a shaped part to mold and the infiltration of molten silicon from the outside into the mold to provide for the in situ formation of the machinable casting or composite having the machinable casting as an abradable layer. As a result, the resulting molten silicon infiltration reaction product contains nibs which must be machined off before the finished part can be used. It would be desirable therefore to produce an abradable material which can be used as rotary sealant to prevent fluids at different pressures from mixing in a gas turbine engine and aircraft engine applications without requiring molten silicon infiltration into a confined cavity resulting in the production of shaped reaction products requiring machining.

The present invention is based on the discovery that blends of silicon powder and carbon fiber containing up to 10% by weight of a binder can be shaped under heat and pressure to produce a preform and thereafter molded at temperatures of up to 1600° C. in a non-oxidizing atmosphere and under reduced pressure to produce abradable rotary seals useful in a variety of applications.

There is provided by the present invention, a method for making a shaped abradable mass useful as a rotary sealant comprising
  (1) mixing together by weight from 60% to 80% of silicon powder having an average particle size in the range of from 25 microns to 200 microns, with 20% to 40% of carbon fiber having a length to diameter ratio with average value of from 104 to 2004 and from 5% to 20% of an organic binder based on the weight of mixture,
  (2) shaping the mixture of (1) under heat and a pressure of up to 3000 psi to produce a preform and
  (3) molding the preform of (2) under reduced pressure at a temperature of up to 1600° C.

Included by the organic resin binders which can be used in the practice of the method of the present invention to produce the rotary seals are, for example, epoxy resin, paraffin, acrylic ester resins, polystyrenes, etc.

Included by the carbon fibers which can be employed in the practice of the present invention are, for example, crushed WDF graphite felt and crushed WCA graphite cloth, manufactured by Union Carbide Corporation.

In the practice of the invention the abradable sealant compositions can be made by initially blending together the silicon powder, the carbon fiber and the binder. The dry blend can then be processed to activate the binder before it is converted to the preform. The preform can then be placed in a mold treated with a release agent and designed to accommodate the preform. The preform can then be heated under reduced pressure while in the mold to a temperature sufficient to convert the powdered silicon to the molten state to provide for in situ interaction between the carbon fiber and the molten silicon in a substantially non-oxidizing atmosphere.

Depending upon the nature of the binder employed in the blend of silicon powder and carbon fiber, the formation of the preform can vary. Experience has shown that in most instances the preform can be made by placing the blend in a mold and pressing it to the desired shape. Accordingly, the mold cavity used to make the preform is generally the same shape as the mold cavity used to produce the final machinable shaped rotary sealant material.

Suitable release agents which can be used to treat the inside surface of the mold employed to convert the preform to the machinable rotary sealant material are, for example, boron nitride, etc. It has been found that the preform can be converted to the machinable rotary sealant material in as little as 5 minutes or less to as long as 30 minutes or more, depending upon the rate which the mold is heated. Temperatures in the range of from 1500° C. to 1800° C. can be used. Effective results can be achieved at reduced pressures of from 0.01 torr to 2000 torr and preferably from 0.1 to 100 torr.

Depending upon the composition of the preform, the resulting machinable rotary sealant can have a density in the range of from 1 to 2. In most instances, optimum abradable characteristics can be achieved while providing satisfactory sealant properties if the density of the rotary sealant is in the range of from 1.1 to 1.3, based on the use of an initial blend having from 72 to 70 percent by weight silicon powder and 28 to 30 percent by weight of carbon fiber.

In order that those skilled in the art will be better able to practice the invention, the following examples are given by way of illustration and not by way of limitation. All parts are by weight.

EXAMPLE 1

A blend of 0.5 part of WDF felt, a product of the Union Carbide Corporation, which had been crushed at 3000 psi, 1 part of 80 mesh powder silicon and 0.1 part paraffin wax was mixed dry then heated to 100° C. for 10 minutes and mixed again. A preform was made by placing the blend in a mold having a ⅞ in. × ⅛ in. cavity and pressed to 3000 psi. The resulting disk was then placed in a boron nitride treated mold having a cavity approximately ⅞ in. × ⅛ in. The preform was heated to a temperature of 1500° C. for 20 minutes while it was maintained at a pressure of 0.5 torr. The mold was then allowed to cool and the ⅞ in. × ⅛ in. disk was removed from the mold. The disk was found to be rigid and porous and easily cut with a hack saw blade.

EXAMPLE 2

A blend of 1.8 WCA cloth, a product of the Union Carbide Corporation, which had been crushed at 15,000 psi, 4.7 parts of 200 mesh silicon powder and 0.6 part epoxy resin was mixed. A preform was made by placing the blend in a mold having a 1.5 in. × 1.7 in. × 0.125 in. cavity and pressed to 3000 psi at 100° C. for 30 minutes. The resulting sheet was removed from the mold and then placed on a previously machined SiC rotary seal backing with 0.1 part epoxy resin used to fix the preform to the SiC surface. This assembly was then placed in a boron nitride treated mold and blended to a temperature of 1550° C. for 20 minutes while it was maintained at a pressure of 100 torr. The mold was then allowed to cool and the SiC backing with the 1.5 in. × 1.7 in. × 0.125 in. sheet attached was removed from the mold. The sheet was found to be rigid, firmly attached to the SiC backing with a Si bond, porous and easily cut with a hack saw blade.

Although the above examples are limited to only a few of the very many variables which can be employed in making the rotary sealants of the present invention, it should be understood that a much broader variety of rotary sealants can be made which are based on the molding of a preform of a blend of a much broader variety of carbon fiber, binder and silicon powder as described in the specification preceding these examples.

What I claim as new and desire to secure by Letters Patent of the United States is:

1. A method for making a shaped abradable mass useful as a rotary sealant comprising
    (1) mixing together by weight from 60% to 80% of silicon powder having an average particle size with 20% to 40% of carbon fiber having a length to diameter ratio with average value of from 1 to 20 and from 5% to 20% of an organic binder based on the weight of mixture,
    (2) shaping the mixture of (1) under heat and a pressure of up to 2000 psi to produce a preform and
    (3) molding the preform of (2) under reduced pressure at a temperature in the range of 1500° C. to 1800° C.

2. A method in accordance with claim 1, where the binder is paraffin wax.

3. A method in accordance with claim 1, where the carbon fiber is obtained from a carbon felt cloth.

4. Rotary sealant material which is readily machinable and has a density of from 1.1 to 1.3, comprising the reaction product of 20% to 40% by weight of carbon fiber whose length to diameter ratio has an average value of from 1 to 20 and 60% to 80% by weight silicon powder having an average diameter of from 25 microns to 200 microns.

* * * * *

UNITED STATES PATENT AND TRADEMARK OFFICE
CERTIFICATE OF CORRECTION

PATENT NO. : 4,150,998
DATED : April 24, 1979
INVENTOR(S) : Charles R. Morelock

It is certified that error appears in the above—identified patent and that said Letters Patent is hereby corrected as shown below:

Column 4, line 16, claim 1, after "size" insert --in the range of from 25 microns to 200 microns, --.

Signed and Sealed this

Twenty-sixth Day of August 1980

[SEAL]

Attest:

SIDNEY A. DIAMOND

Attesting Officer　　Commissioner of Patents and Trademarks